Patented Dec. 11, 1951

2,578,432

UNITED STATES PATENT OFFICE 2,578,432

PROCESS FOR PRODUCING APPARENT SOLIDIFICATION OF LIQUID HYDROCARBONS

Jean Pathus Labour, Washington, D. C., assignor to Gasoline Research Industrial & Commercial Company, Inc., Panama, Panama, a company of Panama No Drawing. Application February 28, 1948, Serial No. 12,153. In France June 27, 1939

Section 1, Public Law 690, August 8, 1946
Patent expires June 27, 1959

7 Claims. (Cl. 44—7)

Methods of solidifying petrol gasoline are of great interest today. National defense in all countries, for instance, calls for the constitution of very large reserves of gasoline, but the constitution of such reserves has a number of drawbacks.

In the first place, one such drawback is the very costly construction of gas-tight tanks, the latest types of which are completely buried in the ground.

Then, the vulnerability of such tanks both to explosive bombs and shells and to incendiary shells, bullets and bombs is another.

Moreover, while gasoline supplies are liable to destruction in time of war, even in peace-time they present a fire hazard and are subject to considerable losses through evaporation.

Finally, stored gasoline, aside from the loss of the lighter products, is itself gradually modified in its chemical composition. Little by little the ethylene hydro-carbons disappear through polymerization at the expense of their own double bonds which are known to be very fragile, resins and gums are formed, and the gasoline becomes discolored and clearly shows from its appearance that it has undergone a deep alteration.

While attempts have been made up to date to solidify gasoline, the majority of such methods are imperfect. None of them, for instance, provides a stable product devoid of any absolute vapour tension and which is capable of resisting evaporation in an open container.

The present invention therefore has for its object the elimination of all those drawbacks. It consists first in forming a colloidal solution of a special Tylose, that is, one which is soluble only in the presence of alkalis or certain salts liable to be subsequently rendered insoluble through precipitation or coagulation.

An alkali soluble cellulose methyl ether containing only one-fourth (¼) methyl ether group per glucose residue prepared by reacting alkali cellulose with methyl choride may be used. "Tylose-type 4S," manufactured and sold by Kalle & Co., Wiesbaden-Biebrich, Germany, for use as a permanent finish for textiles is such a special Tylose.

Such special Tyloses, the colloidal solution of which is prepared for instance in the presence of caustic soda, is dispersed with the petrol gasoline, so as to form a homogeneous and perfectly stable body.

As soon as this state has been obtained the pasty product is passed through a dividing machine in which it is broken up into fragments which may be substantially of the size of a hazelnut. As fast as this breaking up progresses, the gasoline gel falls into a coagulating liquid generally comprising an acid alone, or associated with certain salts.

Thus, one may use sulfuric acid alone, or sulfuric acid associated with sodium sulfate or copper sulfate, or even both said salts together.

Finally the sulfuric acid may be omitted and an acidic salt may be used such as, for instance, the bi-sulfate, or else a neutral salt which should then however be formed from a metal of a heavier series such as lead, iron, manganese, or the like.

The use of the soluble Tylose in the soda may also be effected in the presence of other substances which act either as fillers to provide body to the gel, or act as active substances, or even both as fillers and as active substances. By way of example, such substances may be gelose or pulverized plant wastes. The plants used should contain vegetable juices capable of forming a binder in the presence of soda, the effect of which is cumulative with that of the Tylose. In the last example, set out below, there may thus be involved, simultaneously, a filler and an active substance.

Thus, in the case of the use of active substances with normally deficient effects it is possible to render the same completely efficacious by following the process disclosed herein.

By way of non restrictive examples, the following formulae are given:

I

A. Emulsion—Preparation with Tylose alone:
 Special soda-soluble Tylose _____gr\_\_ 1
 Caustic soda of suitable density \_\_\_gr\_\_ 1
 Water _____gr\_\_ 5 to 10
 Petroleum gasoline _____cc\_\_ 100

B. Coagulating bath:
 Sulfuric acid _____gr\_\_ 20
 Distilled water _____cc\_\_ 1,000
 Sodium sulfate _____gr\_\_ 50

B–2. Further coagulating bath:
 Sulfuric acid _____gr\_\_ 10
 Distilled water _____litre\_\_ 1
 Sodium sulfate _____gr\_\_ 20
 Copper sulfate _____gr\_\_ 50

II

A. Preparation with compounded Tylose:

| | | |
|---|---|---|
| Special soda-soluble Tylose | centigr | 50 |
| Gelose | gr | 1 |
| Caustic soda of suitable density | gr | 1 |
| Water | gr | 15 |
| Petrol gasoline | cc | 100 |

B. Further example of a compounded Tylose:

| | | |
|---|---|---|
| Special soda soluble Tylose | gr | 0.5 to 1 |
| Pulverised plant waste products | gr | 2 |
| Caustic soda of suitable density | gr | 1 |
| Water | gr | 15 |
| Gasoline | cc | 100 |

Whatever formula is selected, it is clearly specified that the use of special Tylose, exclusively of any other Tyloses, is claimed only for the solidification of petrol gasolines.

What is claimed is:

1. The process of producing apparent solidification of liquid hydrocarbons which comprises forming an aqueous emulsion of said hydrocarbons and methyl cellulose insoluble in water but alkali soluble (special "Tylose") and subsequently causing said emulsion to assume a solid form by bringing said emulsion into association with sulfuric acid.

2. The process of producing apparent solidification of liquid hydrocarbons which comprises forming an aqueous emulsion of said hydrocarbons, methyl cellulose insoluble in water but alkali soluble and (special "Tylose") caustic soda and subsequently causing said emulsion to assume a solid form by bringing said emulsion into association with sulfuric acid.

3. The process of producing apparent solidification of liquid hydrocarbons which comprises forming an aqueous emulsion of said hydrocarbons, methyl cellulose insoluble in water but alkali soluble and (special "Tylose") gelose and subsequently causing said emulsion to assume a solid form by bringing said emulsion into association with sulfuric acid.

4. The process of producing apparent solidification of liquid hydrocarbons which comprises forming an aqueous emulsion of said hydrocarbons, methyl cellulose insoluble in water but alkali soluble (special "Tylose"), sodium hydroxide and gelose and subsequently causing said emulsion to assume a solid form by bringing said emulsion into association with sulfuric acid.

5. The process of producing apparent solidification of liquid hydrocarbons which comprises forming an aqueous emulsion of said hydrocarbons and a methyl cellulose insoluble in water but alkali soluble (special "Tylose") and subsequently causing said emulsion to assume a solid form by bringing said emulsion into association with sulfuric acid and sodium sulfate.

6. The process of producing apparent solidification of liquid hydrocarbons which comprises forming an aqueous emulsion of said hydrocarbons and an methyl cellulose insoluble in water but alkali soluble (special "Tylose") and subsequently causing said emulsion to assume a solid form by bringing said emulsion into association with sulfuric acid and copper sulfate.

7. The process of producing apparent solidification of liquid hydrocarbons which comprises forming an aqueous emulsion of said hydrocarbons and a methyl cellulose insoluble in water but alkali soluble (special "Tylose") and subsequently causing said emulsion to assume a solid form by bringing said emulsion into association with sulfuric acid, sodium sulfate, and copper sulfate.

JEAN PATHUS LABOUR.

REFERENCES CITED

The following references are of record in the file of this patent:

FOREIGN PATENTS

| Number | Country | Date |
|---|---|---|
| 860,470 | France | Sept. 30, 1940 |